United States Patent
Strock et al.

(10) Patent No.: US 10,060,281 B2
(45) Date of Patent: Aug. 28, 2018

(54) COMPRESSOR ABRADABLE MATERIAL SEAL WITH TAILORED WEAR RATIO AND DESIRABLE EROSION RESISTANCE

(71) Applicant: United Technologies Corporation, Hartford, CT (US)

(72) Inventors: Christopher W Strock, Kennebunk, ME (US); Changsheng Guo, South Windsor, CT (US); Yan Chen, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 657 days.

(21) Appl. No.: 14/862,430

(22) Filed: Sep. 23, 2015

(65) Prior Publication Data

US 2016/0186595 A1 Jun. 30, 2016

Related U.S. Application Data

(60) Provisional application No. 62/097,415, filed on Dec. 29, 2014.

(51) Int. Cl.
  *F01D 11/12* (2006.01)
  *C22C 19/05* (2006.01)
  (Continued)

(52) U.S. Cl.
  CPC .............. *F01D 11/122* (2013.01); *C22C 9/00* (2013.01); *C22C 9/01* (2013.01); *C22C 9/06* (2013.01);
  (Continued)

(58) Field of Classification Search
  CPC . F01D 11/122; C22C 9/06; C22C 9/01; C22C 9/00; C22C 19/055; Y02T 50/672; F05D 2300/172
  See application file for complete search history.

(56) References Cited

U.S. PATENT DOCUMENTS 3,084,064 A * 4/1963 Cowden .................. C22C 32/00
                                                277/415
4,744,725 A * 5/1988 Matarese .................. C23C 4/18
                                                415/173.4
(Continued)

FOREIGN PATENT DOCUMENTS

| EP | 1010861 | 6/2000 |
|----|---------|--------|
| GB | 2054054 | 2/1981 |
| WO | 2014151101 | 9/2014 |

OTHER PUBLICATIONS

Extended European Search Report dated Jul. 18, 2016 in European Application No. 15201296.9.

*Primary Examiner* — Woody Lee, Jr.
*Assistant Examiner* — Adam W Brown
(74) *Attorney, Agent, or Firm* — Snell & Wilmer L.L.P.

(57) ABSTRACT

What is described is a wear resistant seal system that is adapted for resisting wear of a rotating part in a gas turbine engine as it rotates against a stationary part in the engine. The system includes an axially rotable member including an abrasive tip having a first tensile strength. The system also includes a stationary structure radially exterior and adjacent to the rotable member and including an abradable material. The abradable material includes a matrix material having a second tensile strength that, at least in a first temperature range, is lower than the first tensile strength and a filler material interspersed with the matrix material.

13 Claims, 3 Drawing Sheets

(51) Int. Cl.
*C22C 9/01* (2006.01)
*C22C 9/00* (2006.01)
*C22C 9/06* (2006.01)

(52) U.S. Cl.
CPC ...... *C22C 19/055* (2013.01); *F05D 2300/172* (2013.01); *Y02T 50/672* (2013.01)

(56) References Cited

U.S. PATENT DOCUMENTS

| | | |
|---|---|---|
| 5,048,183 A | 9/1991 | Cang et al. |
| 5,536,022 A * | 7/1996 | Sileo ................. C23C 4/02 277/415 |
| 6,334,617 B1 | 1/2002 | Putnam et al. |
| 6,532,656 B1 * | 3/2003 | Wilkins ............. B23K 31/02 29/402.13 |
| 2004/0060391 A1 * | 4/2004 | Reen ............... C22C 33/0228 75/244 |
| 2014/0140836 A1 | 5/2014 | Embrey et al. |

\* cited by examiner

COMPRESSOR ABRADABLE MATERIAL SEAL WITH TAILORED WEAR RATIO AND DESIRABLE EROSION RESISTANCE

CROSS-REFERENCE TO RELATED APPLICATIONS

This application is a nonprovisional of, and claims priority to, and the benefit of U.S. Provisional Application No. 62/097,415, entitled "COMPRESSOR ABRADABLE MATERIAL SEAL WITH TAILORED WEAR RATIO AND DESIRABLE EROSION RESISTANCE," filed on Dec. 29, 2014, which is hereby incorporated by reference in its entirety.

FIELD

The present disclosure relates generally to an abradable material, and more particularly, to seals formed by an abrasive tip and an abradable material.

BACKGROUND

Gas turbine engines typically include rows, or stages, alternating between rotating blades and stators enclosed within an abradable material housing. The rotating blades rotate about an axis. It may be desirable to seal the separate stages so that air leakage does not occur. Accordingly, the abradable material housing may include an abradable material positioned around each row of rotating blades. During the first run of the gas turbine engine (i.e., the "green run,") the tips of the rotating blades abrade the abradable material. Eventually, the tips of the rotating blades are close to the abradable material of the abradable material housing, thus reducing airflow around each row of rotating blades.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is described is a wear resistant seal system that is adapted for resisting wear of a rotating part in a gas turbine engine as it rotates against a stationary part in the engine. The system includes an axially rotable member including an abrasive tip having a first tensile strength. The system also includes a stationary structure radially exterior and adjacent to the rotable member and including an abradable material. The abradable material includes a matrix material having a second tensile strength that, at least in a first temperature range, is lower than the first tensile strength and a filler material interspersed with the matrix material.

Also described is wear resistant seal system, adapted for resisting wear of a rotating part in a gas turbine engine as it rotates against a stationary part in the engine. The system includes an airfoil configured to rotate about an axis in a compressor or a turbine of the gas turbine engine. The system also includes an abrasive tip positioned on the airfoil and having a first tensile strength. The system also includes a stationary structure radially exterior and adjacent to the airfoil. The stationary structure includes an abradable material that includes a matrix material having a second tensile strength that, at least in a first temperature range, is lower than the first tensile strength. The stationary structure also includes a filler material interspersed with the matrix material.

Also described is a wear resistant seal system that is adapted for resisting wear of a rotating part in a gas turbine engine as it rotates against a stationary part in the engine. The system includes an axially rotable member having an abrasive tip comprising a composition that by weight contains between 17% and 21% chromium, between 2.8% and 3.3% molybdenum, between 50% to 55% nickel, and between 4.75% and 5.5% niobium. The system also includes a stationary structure radially exterior and adjacent to the rotable member. The stationary structure includes an abradable material that includes a matrix material comprising $Cu_5Al$, $Cu_8Al_1Fe$, $Cu_{38}Ni$ or a variant of a group of nickel alloys comprising nickel, copper, iron, manganese, carbon and silicon.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
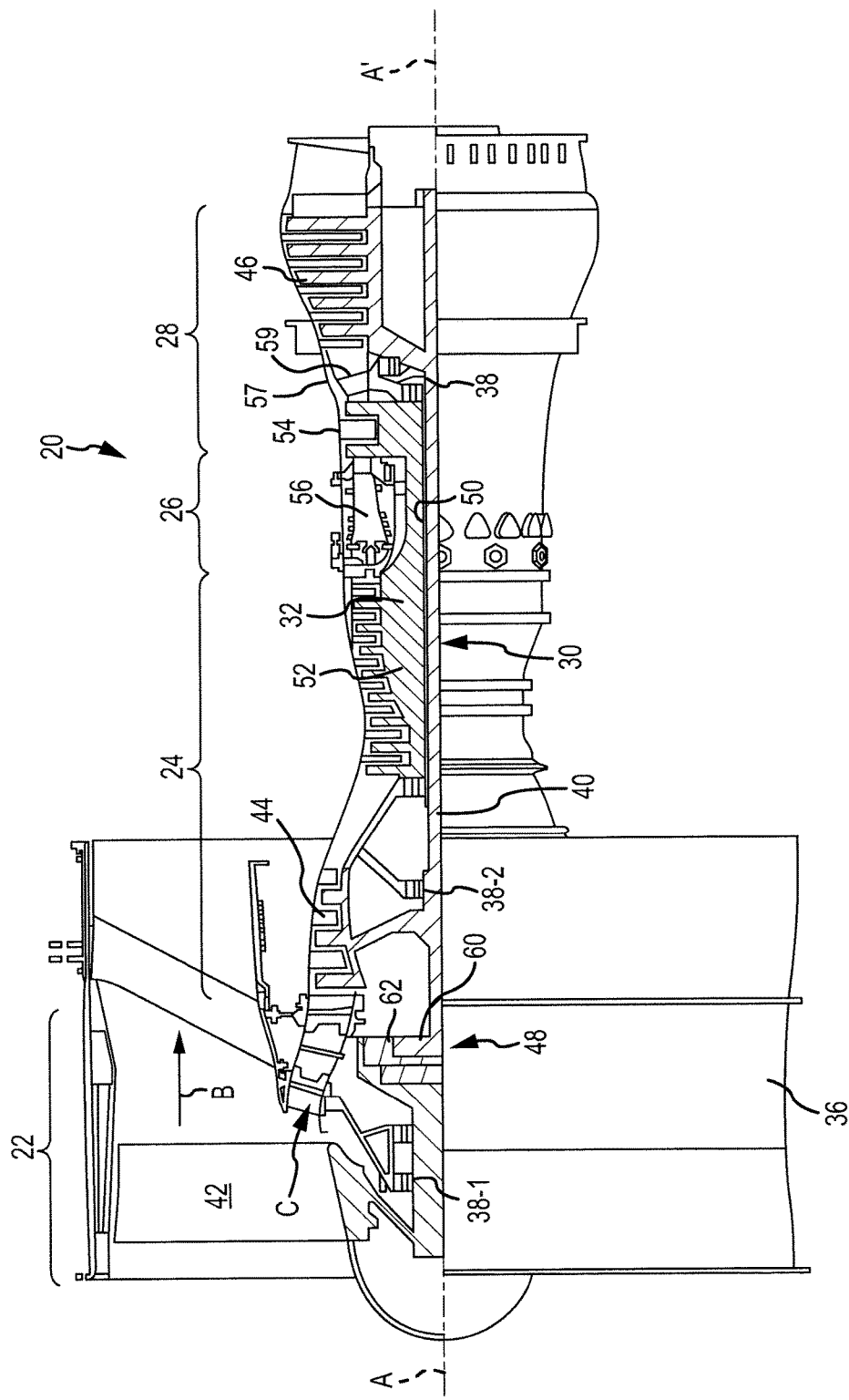
FIG. 1 is cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency which use higher pressure ratios and higher temperatures in high pressure compressor 52 than are conventionally experienced. These higher operating temperatures and pressure ratios may create operating environments that may cause thermal loads that are higher than the thermal loads conventionally experienced, which may shorten the operational life of current components.

Figure 2B:
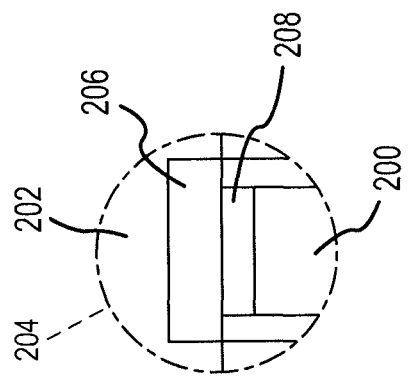
FIG. 2B illustrates a portion of the system of FIG. 2A including an interface area between the rotating blade and the abradable material housing, in accordance with various embodiments.
Figure 2A:
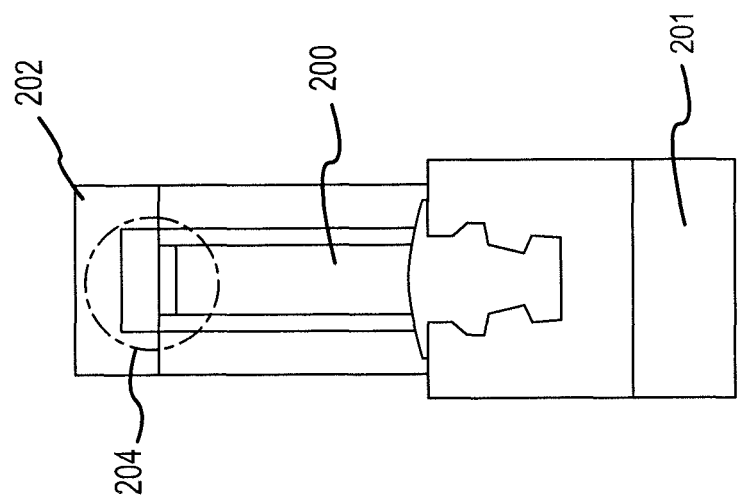
FIG. 2A illustrates a system for forming a seal including a rotating blade within an abradable material housing, in accordance with various embodiments.

FIG. 2A illustrates a system for forming a seal including a rotating blade 200 and an abradable material housing 202 of, for example, compressor section 24 or turbine section 28. Rotating blade 200 may be a rotor blade such as within compressor section 24 or turbine section 28 of gas turbine engine 20. Rotating blade 200 may be any component adapted to form a seal with an abradable material, such as a seal positioned about axis A-A'. In this regard, rotating blade 200 may be any member configured to rotate about an axis, and as such, rotating blade 200 may rotate about an axis 201. The system of FIG. 2A may be used to seal a first area on a first axial side of a rotating part, such as rotating blade 200, from a second area on a second axial side of the rotating blade.

FIG. 2B illustrates a portion 204 of the system of FIG. 2A including the interface of rotating blade 200 and abradable material housing 202. Abradable material housing 202 may be stationary relative to rotating blade 200 such that abradable material housing 202 does not rotate about the axis. Abradable material housing 202 may house rotating blade 200. Abradable material housing may include an abradable material 206. Rotating blade 200 may include an abrasive tip 208. Abrasive tip 208 may include the same composition as the rest of rotating blade 200, or the end of rotating blade 200 may be strengthened by adding a coating, heat treatment, or the like to form abrasive tip 208.

When rotating blade 200 rotates about axis 201, abrasive tip 208 may abrade abradable material 206, causing portions of abradable material 206 to break away from the rest of abradable material 206. After a period of time, abradable material 206 has a shape such that abradable material 206 is adjacent abrasive tip 208, such that abradable material 206 is actually or almost directly in contact with abrasive tip 208. This close proximity creates an effective seal around rotating blade 200.

Abrasive tip 208 may be formed from a metal such as a nickel or cobalt based super alloy, an austenitic nickel-chromium-based alloy such as Inconel™ which is available from Special Metals Corporation of New Hartford, N.Y., USA, composite materials, and other suitable materials.

It is desirable for abrasive tip 208 to abrade (i.e., cause partial wear to) abradable material 206. When force is applied by abrasive tip 208 to abradable material 206 (or vice versa), it is desirable for more of abradable material 206 to become removed than abrasive tip 208.

Figure 3:
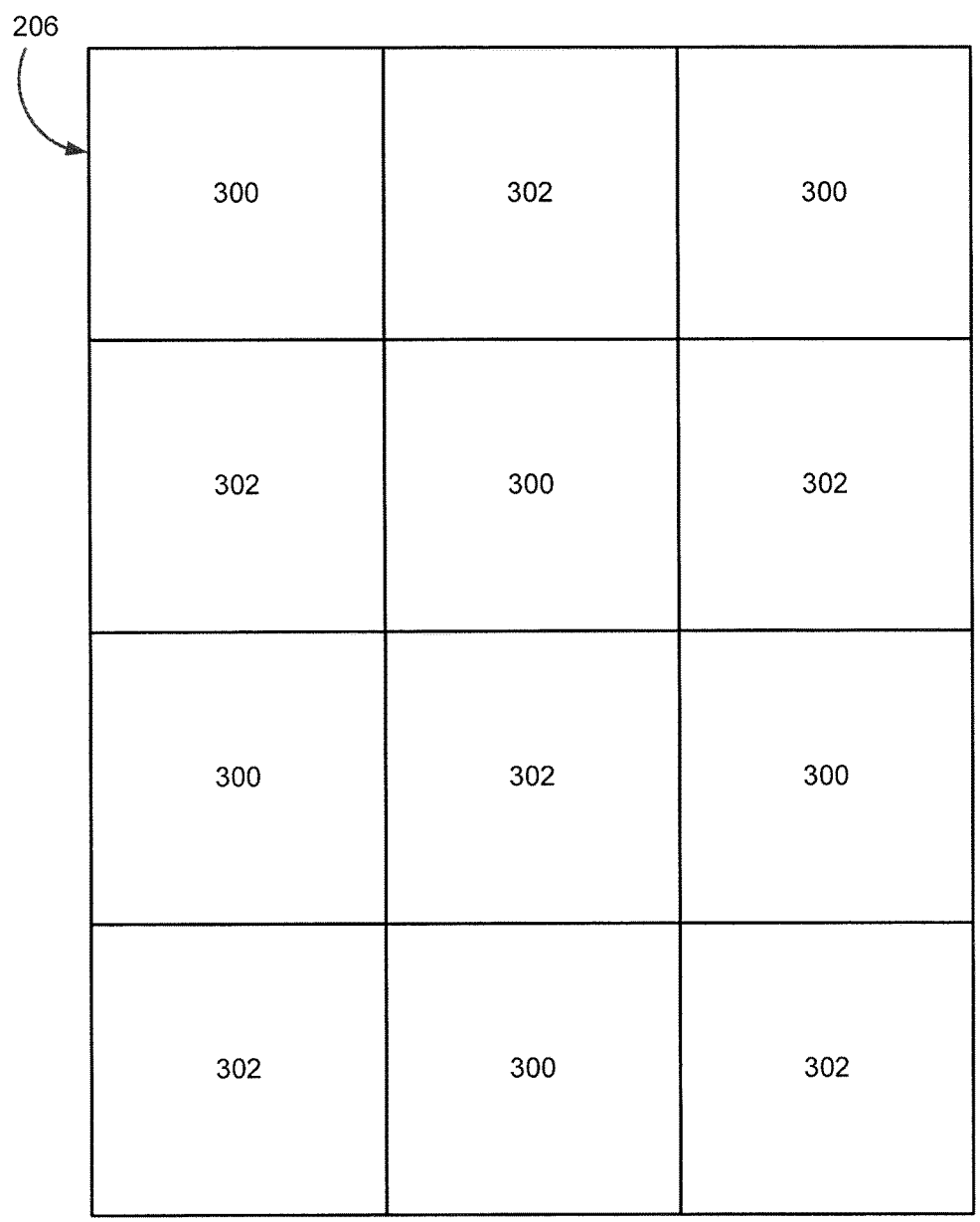
FIG. 3 illustrates a block diagram of an abradable material.

FIG. 3 illustrates a block diagram of abradable material 206. Abradable material 206 includes a matrix material 300 interspersed with a filler material 302. Matrix material 300 may include a metal having a sufficient hardness and tensile strength, such that abradable material 206 may substantially retain its form when exposed to high temperatures and pressures.

It was generally believed in the industry that when abrasive tip 208 contacted abradable material 206, portions of abradable material 206 were removed based on filler material 302. A matrix material was selected having a high tensile strength and/or a high yield strength. This selection was made because it was believed in the industry that the filler material was sufficient to cause portions of the abradable material to be removed with limited damage to the abrasive tip, and that the high tensile strength would prevent damage to the abradable material. However, during normal wear, the abrasive tip in such configurations caused particles of the matrix material to become removed instead of portions of the filler material. Thus, the wear impact between an abrasive tip and an abradable material during normal use (i.e., a non-high interaction event) is a function of the hardness of matrix material 300.

Accordingly, the likelihood of damage to an abrasive tip may be reduced by forming a matrix material from a softer material than the abrasive tip. Therefore, according to the disclosure, abrasive tip 208 is comprised of a harder material than matrix material 300. With this configuration, more material will be removed from abradable material 206 than abrasive tip 208 during an interaction.

Intended operating temperatures in an area proximate rotating blade 200 and abradable material housing 202 may vary. For example, the temperatures may vary from −40 degrees Fahrenheit (−40° F., −40° C.) up to about 1500° F. (815° C.), based on numerous factors. Additionally, friction between abrasive tip 208 and abradable material 206 may cause the immediate temperatures around abrasive tip 208 and abradable material 206 to increase over the intended operating temperatures by another 1000° F. (538° C.). Thus, the temperatures around abrasive tip 208 and abradable material 206 may vary from −40° F. (−40° C.) to 2500° F. (1371° C.). The specific temperature ranges may be further limited based on the position of rotating blade 200 and abradable material housing 202 within gas turbine engine 20. For example, ambient temperatures are higher in high pressure compressor 52 than low pressure compressor 44.

In various embodiments, abrasive tip 208 may include an austenitic nickel-chromium-based alloy, such as a composition that by weight contains between 17% and 21% chromium, between 2.8% and 3.3% molybdenum, between 50% to 55% nickel, and between 4.75% and 5.5% niobium. Such a composition is sold commercially as INCONEL 718 by the Special Metals Corporation Huntington, W. Va., USA. Filler material 302 may be a material such as hexagonal boron nitride (hBN). A desirable matrix material 300 for use with an Inconel™ 718 abrasive tip 208 is $Cu_5Al$. Other desirable alloys for matrix material 300 may include $Cu_8Al_1Fe$, $Cu_{38}Ni$, and variants of nickel and copper alloys. Matrix material 300 may include any of a group of nickel alloys comprising up to 67 percent (67%) nickel as well as copper and small amounts of iron, manganese, carbon and silicon, such as Monel™ alloys, which are available from Special Metals Corporation of New Hartford, N.Y., USA.

Abrasive tip 208 may contact abradable material 206 at any temperature within a given range. The hardness of the materials of abrasive tip 208 disclosed may be greater than the hardness of the materials of matrix material 300 for all temperatures within the given range for the particular pairing of rotating blade 200 and abradable material housing 202.

The tensile strength of abrasive tip 208 may be greater than the tensile strength of matrix material 300 for all temperatures within the given range for the particular pairing of rotating blade 200 and abradable material housing 202.

However, during normal operation of a gas turbine engine, force may be applied to abradable material 206 by airflow and debris. It is desirable for matrix material 300 to have a sufficient tensile strength such that this airflow and debris will not damage abradable material 206. In various embodiments, it is desirable for the tensile strength of abradable material 206 to be between 1000 psi and 3000 psi (between 6.9 Megapascal (Mpa) and 20.7 Mpa). This tensile strength of abradable material 206 may be sufficient to reduce the likelihood of damage to abrasive tip 208 or rotating blade 200 during a high interaction rate event and to reduce the likelihood of damage to abradable material 206 via airflow and debris. The above-referenced materials for matrix material have sufficient tensile strength to resist damage from debris and still have a lower tensile strength than the material of abrasive tip 208.

Matrix material 300 may be single phase material such that it includes a single crystal structure within the particular range of temperatures. An intermetallic structure may not be desirable as it may include multiple crystal structures within the range of temperatures. A change in crystal structure may be associated with a volume change of the material. In response to a volume change, stresses may be induced in the material. By using a single phase material, the likelihood of these stresses is reduced.

The above-disclosed materials are predominately single phase structure materials, such that the crystal shape does not change up to their melting point. Additionally, these materials have no phase changes within the operating temperatures. This reduces the likelihood of thermal cycle induced failures. Because these materials do not change phases within the operating temperature range, their volume remains substantially constant, thus reducing the likelihood of structural issues.

Matrix material 300 may have a lower melting point than abrasive tip 208. This reduces the likelihood that abrasive tip 208 will fail in response to a critical temperature being reached. As mentioned above, in response to friction between abrasive tip 208 and abradable material 206, additional heat may be generated. When two materials are in friction, causing heat, if one material melts, the friction heat ceases to exist. Therefore, if matrix material 300 has a lower melting point than abrasive tip 208, matrix material 300 will change states, thus reducing the temperature and the likelihood of failure of abrasive tip 208.

The melting points of the above-disclosed materials are between 1832° F. and 1922° F. (1000° C.-1050° C.). This is greater than 25% lower than the melting point of Inconel™ 718 which is about 1350° C. Because the melting point is lower for these materials than Inconel™ 718, their strength will go to 0 at the melting point, which is well before the melting point of Inconel™ 718, meaning that they will melt and friction temperatures will be reduced well before the melting point of Inconel™ 718.

Matrix material 300 may have a yield strength that is at least twenty five percent (25%) lower than that of abrasive tip 208. The yield strength of matrix material 300 may be at least 25% lower than that of abrasive tip 208 over the temperature range. Using the above-disclosed materials, volumetric wear between abradable material 206 and abrasive tip 208 may be at least 90% attributed to abradable material 206 and less than 10% attributed to abrasive tip 208, meaning at least 90 percent of the volume lost during an interaction will be from abradable material 206.

The above-referenced materials for matrix material 300 are ductile and have sufficient tensile strength to resist erosion and cracking within the operating temperatures. Yet another benefit is that these materials have a lower tensile strength and hardness than Inconel™ 718 at any temperature, meaning that use of these materials reduces the likelihood of damage to abrasive tip 208.

Other compounds which may be well suited for matrix material 300 may include alloys including copper, nickel, cobalt and chromium. When combined, these elements form alloys with a wide range of melting points with ductile single phase structure.

Aluminum may be added to these alloys in order to add oxidation resistance. However, aluminum addition should be limited to prevent excessive formation of intermetallic compounds that may harden and make matrix material 300 become more brittle and/or include multiple phases within the desired temperature range. For example, an alloy of the above-mentioned materials having 8% weight or less of aluminum (i.e., of any volume of the alloy, the weight of the aluminum will comprise 8% or less of the total weight of the volume) should sufficiently reduce the likelihood if excessive formation of intermetallic compounds. In particular, iron added to an alloy having aluminum may suppress the formation of intermetallic material, thus allowing a higher weight percent of aluminum to be used without formation of intermetallics. Additionally, iron may help to suppress the melting point of an alloy containing aluminum.

With reference to FIGS. 2A, 2B and 3, rotating blade 200 and/or abradable material housing 202 may shift relative to axis 201, possibly causing a high interaction event. In these situations, it is desirable to reduce damage to rotating blade 200. With reference to FIG. 3, filler material 302 may comprise a material that is softer, that is, structurally weaker, than matrix material 300 and material of abrasive tip 208. In this manner, when rotating blade 200 and/or abradable material housing 202 suddenly shift relative to axis 201, abrasive tip 208 may cause splats of abradable material 206 to become removed because of filler material 302, thus reducing the likelihood of damage to abrasive tip 208, and thus rotating blade 200. Thus, it is still desirable for abradable material 206 to include filler material 302, as filler material 302 is structurally weaker than matrix material 300 and allows splats of abradable material 206 to become removed in response to a high impact collision with abrasive tip 208.

Benefits, other advantages, and solutions to problems have been described herein with regard to specific embodiments. The scope of the disclosure, however, is provided in the appended claims.

The invention claimed is:

1. A wear resistant seal system, adapted for resisting wear of a rotating part in a gas turbine engine as it rotates against a stationary part in the engine, the system comprising:

an axially rotable member including an abrasive tip having a first tensile strength; and
a stationary structure radially exterior and adjacent to the rotable member, the stationary structure including an abradable material that includes:
a matrix material having a second tensile strength that, at least in a first temperature range, is lower than the first tensile strength, wherein the matrix material includes at least one of Cu5Al, $Cu_8Al_1Fe$ or $Cu_{38}Ni$; and
a filler material interspersed with the matrix material.

2. The wear resistant seal of claim 1, wherein the rotating member is a blade and the stationary member is a blade housing.

3. The wear resistant seal of claim 1, wherein the matrix material has a single phase up to an onset of melting.

4. The wear resistant seal of claim 1, wherein a first melting point of the matrix material is lower than a second melting point of the abrasive tip.

5. The wear resistant seal of claim 1, wherein a first yield strength of the matrix material is at least 25 percent lower than a second yield strength of the abrasive tip.

6. The wear resistant seal of claim 1, wherein, in response to an interaction between the abradable material and the abrasive tip, at least 90 percent of volumetric loss is attributed to the abradable material.

7. The wear resistant seal of claim 1, wherein the matrix material has a third tensile strength that, in a second temperature range, is lower than the first tensile strength.

8. The wear resistant seal of claim 1, wherein the filler material is structurally weaker than the matrix material.

9. The wear resistant seal system of claim 1, wherein a first yield strength of the matrix material is at least 25 percent lower than a second yield strength of the abrasive tip.

10. A wear resistant seal system, adapted for resisting wear of a rotating part in a gas turbine engine as it rotates against a stationary part in the engine, the system comprising:

an airfoil configured to rotate about an axis in a compressor or a turbine of the gas turbine engine;
an abrasive tip positioned on the airfoil and having a first tensile strength; and
a stationary structure radially exterior and adjacent to the airfoil, the stationary structure including an abradable material that includes:
a matrix material having a second tensile strength that, at least in a first temperature range, is lower than the first tensile strength, wherein the matrix material includes at least one of $Cu_5Al$, $Cu_8Al_1Fe$, or $Cu_{38}Ni$, and
a filler material interspersed with the matrix material.

11. The wear resistant seal system of claim 10, wherein the second tensile strength is lower than the first tensile strength between −40 degrees Fahrenheit and 1,922 degrees Fahrenheit.

12. The wear resistant seal system of claim 10, wherein the matrix material has a single phase up to an onset of melting.

13. A wear resistant seal system, adapted for resisting wear of a rotating part in a gas turbine engine as it rotates against a stationary part in the engine, the system comprising:

an axially rotable member having an abrasive tip comprising a composition that by weight contains between 17% and 21% chromium, between 2.8% and 3.3% molybdenum, between 50% to 55% nickel, and between 4.75% and 5.5% niobium; and a stationary structure radially exterior and adjacent to the rotable member, the stationary structure including an abradable material that includes a matrix material comprising $Cu_5Al$, $Cu_8Al_1Fe$, or $Cu_{38}Ni$.

* * * * *